United States Patent [19]

Maekawa et al.

[11] Patent Number: 4,826,425

[45] Date of Patent: May 2, 1989

[54] CONSTANT AMOUNT CERAMIC BATCH SUPPLYING APPARATUS

[75] Inventors: Hideya Maekawa, Tokai; Tokimasa Kawamura, Nagoya, both of Japan

[73] Assignee: NGK Insulators, Ltd., Japan

[21] Appl. No.: 110,100

[22] Filed: Oct. 15, 1987

Related U.S. Application Data

[63] Continuation of Ser. No. 904,282, Sep. 8, 1986, abandoned.

[30] Foreign Application Priority Data

Sep. 12, 1985 [JP] Japan .......................... 60-138644[U]

[51] Int. Cl.[4] .............................................. B29B 11/06

[52] U.S. Cl. ................................ 425/586; 264/176.1; 425/296; 425/311; 425/376.1; 425/469; 425/812

[58] Field of Search ..................... 264/176.1, 241, 349; 425/129.1, 205, 256, 289, 296, 297, 307, 310, 311, 312, 376.1, 377, 381.2, 451.2, 469, 544, 561, 585, 586, 812

[56] References Cited

U.S. PATENT DOCUMENTS

| | | | |
|---|---|---|---|
| 1,001,231 | 8/1911 | Sullivan | 425/311 |
| 1,226,668 | 5/1917 | Jeffery | 425/311 |
| 1,406,666 | 2/1922 | Lohmann | 264/349 |
| 1,987,358 | 1/1935 | Bonnot | 425/205 |
| 2,615,207 | 10/1952 | Dickey | 264/349 |
| 2,751,626 | 6/1956 | Lyijynen et al. | 425/812 |
| 3,390,216 | 6/1968 | Umeya et al. | 425/205 |
| 4,373,889 | 2/1983 | Brown | 425/451.2 |
| 4,375,781 | 3/1983 | Bessho | 425/451.2 |
| 4,397,630 | 8/1983 | Meeker | 425/586 |
| 4,483,046 | 11/1984 | Briddell | 425/296 |
| 4,565,512 | 1/1986 | Wills et al. | 264/142 |
| 4,588,539 | 5/1986 | Rossi | 425/451.2 |
| 4,592,713 | 6/1986 | Gutjahr | 425/451.2 |

FOREIGN PATENT DOCUMENTS

| | | |
|---|---|---|
| 617432 | 8/1935 | Fed. Rep. of Germany . |
| 1053997 | 3/1959 | Fed. Rep. of Germany . |
| 1072534 | 12/1959 | Fed. Rep. of Germany . |
| 2500165 | 7/1976 | Fed. Rep. of Germany . |

*Primary Examiner*—Jay H. Woo
*Assistant Examiner*—C. Scott Bushey
*Attorney, Agent, or Firm*—Parkhurst, Oliff & Berridge

[57] ABSTRACT

An apparatus for supplying constant amount of ceramic batches includes a cylinder having a cover adapted to be opened for receiving ceramic material in the cylinder and closed and locked when the ceramic material is compressed, a piston telescopically moving in the cylinder with a clearance therebetween, a taper portion provided on the cylinder and tapered toward a discharge opening of the taper portion to compact the ceramic material compressed by the piston toward the taper portion, and cutting means at the discharge opening. With this apparatus, the indefinite ceramic material is automatically transformed into constant shape and constant amount batches which are supplied into a predetermined apparatus simply in short time. The compacting and deaerating of the ceramic batches can be effected during the operation of supplying the constant batches.

3 Claims, 2 Drawing Sheets

CONSTANT AMOUNT CERAMIC BATCH SUPPLYING APPARATUS

This is a continuation of application Ser. No. 904,282 filed Sept. 8, 1986, now abandoned.

BACKGROUND OF THE INVENTION

This invention relates to a constant amount ceramic batch supplying apparatus for supplying ceramic batches of constant amounts to a ceramic batch producing machine, extruding forming machine or the like.

In a vacuum auger machine, screw type extruder and screw type transferring machine, ceramic batches of constant amounts should be supplied to these apparatuses in order to effect producing, handling, extruding, forming or transferring operations of ceramic batches of predetermined amounts and/or at predetermined speeds.

In case that these ceramic batches are lumps or indefinite in shape as those kneaded by a kneader or the like, the batches are manually treated into suitable sizes as by cutting them. In this manner, batches of substantially constant amounts are then manually supplied into these apparatuses.

Accordingly, the operation for supplying the ceramic batches of constant amounts into these apparatuses is very bothersome and does not achieve the supply of the batches in sufficiently constant amounts.

SUMMARY OF THE INVENTION

It is an object of the invention to provide a constant amount ceramic batch supplying apparatus which eliminates all the disadvantages of the prior art and which is able to make an indefinite amount of ceramic material into a constant shape so as to be supplied in constant amounts into a predetermined apparatus.

In order to achieve this object, an apparatus for supplying ceramic batches of constant amount according to the invention comprises a cylinder having a cover for receiving ceramic material in the cylinder, a piston telescopically moving in the cylinder with a clearance therebetween, a taper portion provided on said cylinder and tapered toward a discharge opening of the taper portion to compact the ceramic material compressed by the piston toward the taper portion, and cutting means at the exhaust opening.

In a preferred embodiment, the cover comprises two split covers opened and closed by hydraulic cylinders and has a lock mechanism for holding the closed split covers.

In another embodiment, the piston is provided with a plurality of guide rods slidable in sleeves fixed to a frame of the apparatus.

With the above apparatus, the indefinite ceramic material is supplied into the cylinder with opened cover. After the cover is closed and locked, the material is compressed by the piston toward the taper portion to be compacted. This compacting operation forces the air in the cylinder out of it through the clearance between the piston and cylinder with the aid of the pressurizing operation of the piston, and makes small the clearances formed between batches of the material indefinite in shape. The compacted material is further pushed by the piston into the taper portion, where the indefinite batches are squeezed to be pressed with each other so as to be compacted and are then extruded out of a front end of the taper portion. By this compacting operation, the density of the material in the taper portion becomes substantially constant. The extruded batch is then cut into desired lengths by the cutting defive to obtain batches of substantially constant weight which can be supplied to a vacuum auger machine, screw type extruder or the like. In other words, as the material is compacted by the piston and further squeezed in the taper portion so as to be compacted, only by cutting the extruded material into predetermined lenghts can constant amount of batches be supplied into 1 machine such as a vacuum auger machine.

The invention will be more fully understood by referring to the following detailed specification and claims taken in connection with the appended drawings.

BRIEF DESCRIPTION OF THE DRAWINGS

FIG. *1a* is a front elevation partially in section of one embodiment of the apparatus according to the invention; and FIG. *1b* is a side view partially in section of the apparatus shown in FIG. *1a*.

DESCRIPTION OF THE PREFERRED EMBODIMENTS

Figure 1A:
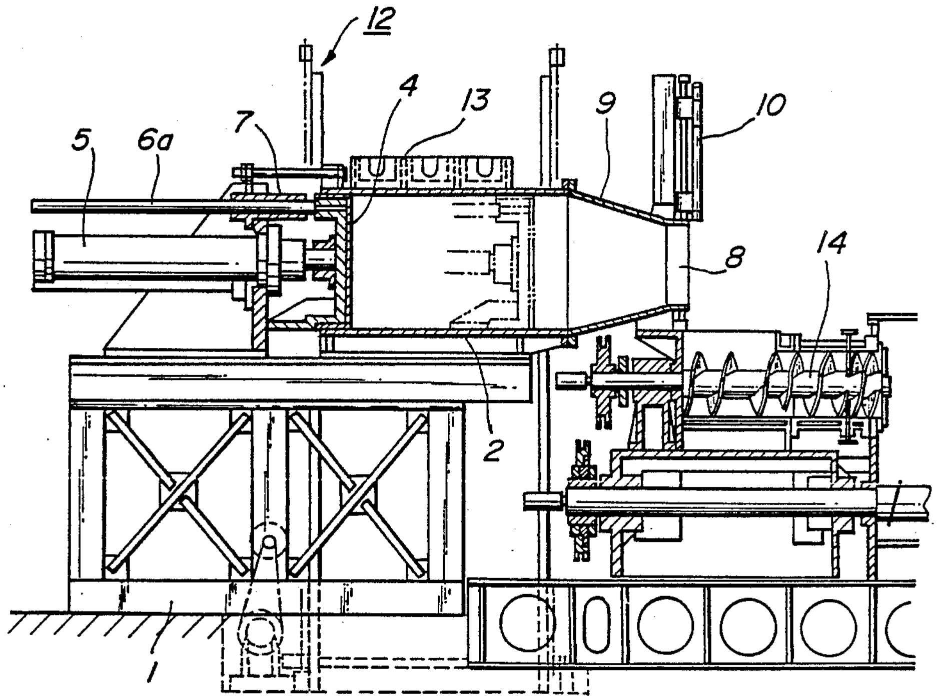
Figure 1B:
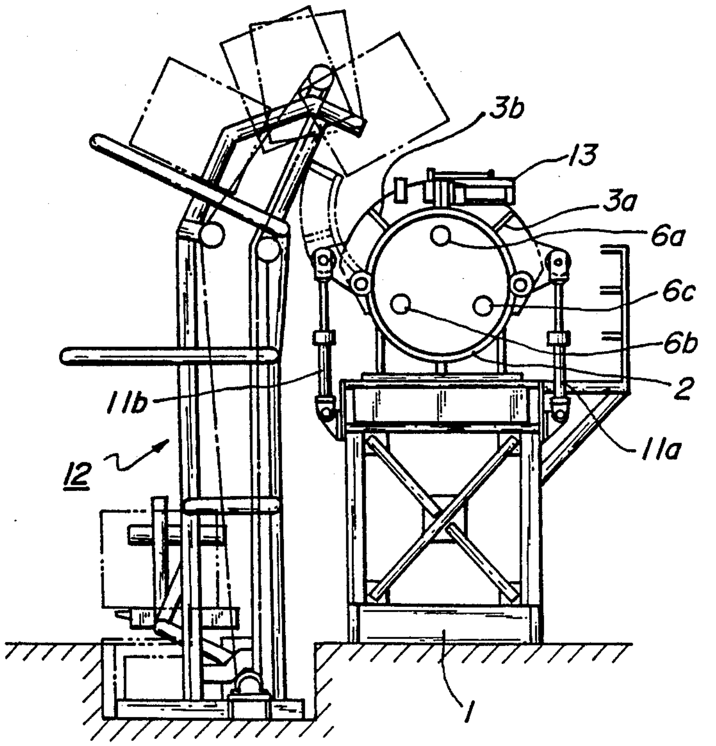

FIGS. 1*a* and 1*b* illustrate one embodiment of the invention partially in section respectively in front and side views. In this embodiment, a cylinder 2 provided on a base 1 includes on an upper portion a cover which is divided into two split covers 3*a* and 3*b*.

A piston 4 which is of a size engageable in the cylinder 2 is provided in an open end of the cylinder 2 so as to be telescopically movable in the cylinder 2 with a hydraulic cylinder 5 provided on the base 1 for the piston driving. There is a clearance between the piston 4 and the cylinder 2, so that the air in the cylinder can be discharged through the clearance out of the cylinder 2 when the piston 4 is inserted into and moved forward in the cylinder 2. The piston 4 is provided with three guide rods 6*a*, 6*b* and 6*c* slidable in sleeves 7 fixed to the base 1 in order to position and introduce the piston 4 into the cylinder 2.

The cylinder 2 is provided on the other end with a taper portion 9 having at a tapered end a ceramic batch discharge opening 8. The taper portion 9 serves to compact the supplied indefinite ceramic material in cooperation with the piston 4. In more detail, the supplied indefinite ceramic material is compressed and driven toward the taper portion 9 by the piston 4, so that the ceramic material is uniformly compacted by the wall of the tapered portion 9 to be discharged as uniform ceramic batches from the discharge opening 8. The discharge opening 8 is provided with a cutting device 10 for cutting the exhausted ceramic batches into desired lengths, so that the ceramic batches of constant volumes or amounts can be supplied into an auger machine or the like.

As shown in FIG. 1*b*, moreover, the split covers 3*a* and 3*b* are operated by hydraulic cylinders 11*a* and 11*b* provided on the base 1, so that the covers 3*a* and 3*b* are opened when the indefinite ceramic material is supplied into the cylinder 2 by means of a ceramic batch supplying device 12 and the covers 3*a* and 3*b* are closed and locked by a lock mechanism 13 when the supplied ceramic batch is extruded by means of the piston.

The operation of the constant amount ceramic batch supplying apparatus according to the invention for actually supplying the ceramic batch into an auger machine will be explained hereinafter. First, after the lock mechanism 13 is released, the hydraulic cylinders 11*a* and 11*b* are actuated so as to open the split covers 3*a* and 3*b* to supply the indefinite ceramic material from the ceramic batch supplying device into the cylinder 2. Then, the split covers 3*a* and 3*b* are closed and locked by the lock mechanism 13. Thereafter, the hydraulic cylinder 5 is actuated to insert the piston 4 into the cylinder 2 at a high speed until the supplied ceramic batch is filled in the taper portion 9 to cause a predetermined pressure therein. In doing so, after the pressure acting upon the piston 4 has been detected to be more than a predetermined pressure by a pressure sensor (not shown), the piston 4 is further inserted at a lower constant speed toward the taper portion 9. In this manner, the compacted and homogenized ceramic batch is discharged in a constant shape at a constant speed from the ceramic batch discharge opening 8. The discharged ceramic batch from the opening 8 is cut by the cutting device 10 into constant amounts or volumes. The cut batches of the constant amounts are supplied into an auger machine by means of a primary screw 14 of the auger machine. On the other hand, the cutting device 10 comprises a moving frame (not shown) to which is fixed a wire or blade longer than a diameter of the discharge opening 8. The moving frame is moved upward and downward by hydraulic or pneumatic cylinders to cut the discharged material. Moreover, all the above operations are controlled by control means (not shown).

Although the constant ceramic batch supplying apparatus for the auger machine has been explained, this is only by way of example and the apparatus may of course be useful for an extruding forming machine or the like.

As can be seen from the above explanation, the constant ceramic batch supplying apparatus according to the invention automatically transforms the indefinite ceramic material into constant amount batches and supplies them into an auger machine or the like simply in short time, which would otherwise be troublesome in the prior art. In the apparatus according to the invention, the compacting and deaerating of the ceramic batches can be effected during the operation of supplying the constant batches.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for supplying constant amount ceramic batches, comprising a substantially horizontally disposed cylinder having a cover and associated opening on an upper side portion thereof for receiving ceramic material in the cylinder, said cover comprising two split covers opened and closed by hydraulic cylinders and having a lock mechanism for holding closed the split covers;

a piston telescopically movable in the cylinder with a clearance therebetween large enough to allow air in said cylinder to be discharged as the piston moves forward for assisting in deaerating the ceramic material, said piston being provided with a plurality of guide rods slidable in sleeves fixed to a frame of the apparatus;

a taper portion provided on said cylinder and tapered toward a discharge opening of the taper portion to compact the ceramic material compressed by the piston toward the taper portion; and cutting means at the discharge opening.

2. An apparatus as set forth in claim 1, in combination with a screw type transferring machine arranged to receive said constant amount ceramic batches from said apparatus.

3. An apparatus as set forth in claim 1, in combination with a batch supplying apparatus arranged to sequentially empty boxes of ceramic material into said opening.

* * * * *